T. R. VARNELL.
GATE LATCH.
APPLICATION FILED APR. 9, 1908.
931,163.
Patented Aug. 17, 1909.
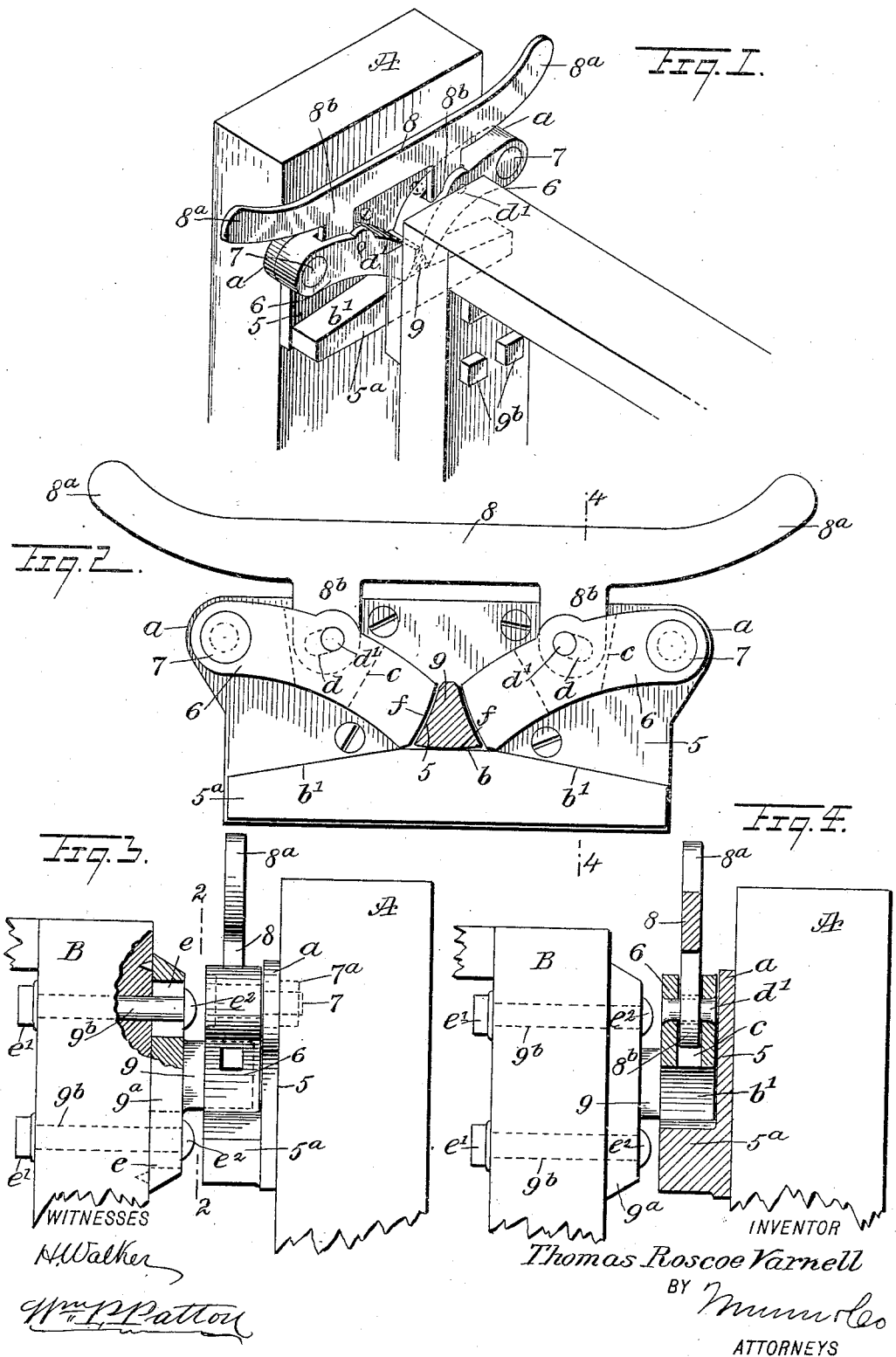

UNITED STATES PATENT OFFICE.

THOMAS ROSCOE VARNELL, OF EMORY, VIRGINIA.

GATE-LATCH.

No. 931,163.     Specification of Letters Patent.     Patented Aug. 17, 1909.

Application filed April 9, 1908. Serial No. 426,039.

*To all whom it may concern:*

Be it known that I, THOMAS ROSCOE VARNELL, a citizen of the United States, and a resident of Emory, in the county of Washington and State of Virginia, have invented a new and Improved Gate-Latch, of which the following is a full, clear, and exact description.

This invention relates to securing means for large or small gates, and has for its object to provide novel details of construction for a swinging gate latch, that will retain the gate in closed condition at a post, until the latch is manually released.

The invention consists in the novel construction and combination of parts, as is hereinafter described, and defined in the appended claims.

Reference is to be had to the accompanying drawings forming a part of this specification, in which similar characters of reference indicate corresponding parts in all the views.

Figure 1 is a perspective view of the improved latch mounted upon a gate, and upon a latch post toward which the gate swings and is secured by the improved latch; Fig. 2 is an enlarged side view of the improved latch, a portion being shown in section taken substantially on the line 2—2 in Fig. 3; Fig. 3 is a broken and partly sectional side view of the upper portion of a gate post, a corresponding side view of the upper portion of a gate end bar, and a partly sectional side view of the improved latch, mounted upon the post and gate bar and adjusted for holding the bar fastened to the post; and Fig. 4 is a transverse sectional view of the improved latch taken substantially on the line 4—4 in Fig. 2.

A bracket plate 5 is provided as a support for other details of the latch, and as shown, is in the form of a flat metal plate preferably formed with two similar ears, $a$, $a$, which project laterally and oppositely from the upper portion of the bracket plate; and as shown in Fig. 1, said plate is secured in position upon the upper portion of a latching post A, by screws or other means, the heads of the securing screws appearing in Fig. 2.

Two latch dogs 6, 6 of similar form are principal features of the improvement, and each dog is in the form of a flat metal bar having parallel edges, one edge that is uppermost in service being convex and the lower edge thereof concave, as shown in Fig. 2. The outer ends of the latch dogs 6, 6 are rounded edgewise and transversely perforated near said edges, for reception of pivot bolts 7, 7 which are inserted through these perforations and also through alined perforations in the bracket plate 5, formed centrally in the rounded ears $a$, $a$, these pivot bolts being reduced in diameter where they pass through the bracket plate, and at their threaded ends receive nuts $7^a$ which secure the pivot bolts in place but permit the dogs 6, 6 to rock freely thereon. At their free ends, the latch dogs 6, 6 are each convexed on the arc of a circle that has the axes of the pivot bolts 7, 7, as radial centers, and these convexed ends $f$ are suitably spaced apart for a purpose that will hereinafter appear.

Upon the lower transverse edge of the bracket plate 5 and preferably formed integral therewith, is a track bar $5^a$ that projects outwardly and extends the full width of said bracket plate.

Centrally upon the upper face of the track bar $5^a$, a level surface is provided as shown at $b$ in Fig. 2, and from said horizontal portion the upper surface of the track bar inclines outward and downward an equal degree, as shown at $b'$ in the same figure; and it will be noted that the free ends of the latch dogs 6, 6, rest upon the track bar about where the slopes or inclines $b'$ merge into the horizontal surface $b$.

Near the center of length, each latch dog 6 is vertically slotted lengthwise thereof and at the transverse center, these slots $c$, $c$, one in each dog, being preferably flared on their end walls, thus increasing their width at their upper ends.

A tripping bar 8 is a coacting detail for controlling the dogs 6, 6, and as shown, is in the form of a flat bar that is curved edgewise and upwardly at and near each end thereof, thus providing two handles $8^a$ thereon.

At a preferably equal distance from the longitudinal center of the tripping bar 8, two similar lugs $8^b$ are downwardly extended from the lower edge of said bar, these lugs fitting loosely into the slots $c$, $c$.

There is a short transverse slot $d$ formed in each lug $8^b$ which trends outward and downward as shown by dotted lines in Fig. 2.

Near the longitudinal center of each slot $c$, the defining walls thereof are transversely perforated and in these perforations a pivot bolt $d'$ is inserted, that also passes through a respective slot $d$ and may be secured therein at the ends, as is indicated in Fig. 4.

It will be seen that upon raising the tripping bar 8 at either end $8^a$, the latch dog nearest to said handle $8^a$ will be correspondingly lifted from the track bar $5^a$, having the lower inner corner of the other latch dog for a fulcrum, and obviously, a downward pressure on either handle $8^a$, will raise the latch dog that is farthest from the handle which had been depressed.

A completing element of the improved gate latch consists of a latching arm 9, that projects outward from a base plate $9^a$, said plate being secured upon the end face of an upright end bar B of a gate that is to be latched fast to the post A, when the gate is swung from either side thereof toward the latching post. The arm 9 as best shown in Fig. 2, is concaved on opposite sides, and these sides converge upwardly, terminating at their upper end in a convex upper edge for the arm, the lower face of said arm being also convexed a lesser degree as appears in said figure. The base plate $9^a$ is preferably slotted vertically at suitable points, as shown at $e$ in Fig. 3, for the reception of clamping bolts $9^b$, that are passed through said slots $e$ and thence through opposite perforations in the upright end bar B of the gate, whereon the base plate is secured by said bolts and by nuts $e'$ on threaded ends of the bolts, the heads $e^2$ of the bolts bearing on the outer face of the base plate, as shown in Figs. 3 and 4. The base plate $9^a$ is so positioned on the face of the end bar B, opposed to the latch dogs 6, that the latching arm 9 will ride upon either sloped surface $b'$, when the gate of which said end bar is a portion is swung toward the post A for closure of the gate.

In operation, assuming that the gate is open from either side of the post A, an impetus given to the gate which will swing it toward the post, will cause the latching arm 9, to slide freely up the inclined surface of the track bar it approaches, and then lift the adjacent latch dog 6. The arm 9 will then impinge upon the end of the other latch dog 6, which will arrest the arm and release the elevated dog, that will drop by its gravity and have a loose engagement with the opposite side of the arm 9. It will be noted that the position of the arm 9, being below the centers of the pivot bolts 7, causes the lower corners of the convexed ends of the latch dogs 6, to have slight clearance from the arm, when either dog is rocked upward, so that the dogs and tripping bar 8, may be freely manipulated for opening of the gate in either direction. It will also be seen that the slight inclination given to the slots $d$ in the lugs $8^b$, adapts the weight of the tripping bar 8 to press upon the pivots $d'$ and take up any wear or lost motion that may occur, so that rattling of these members of the gate latch is prevented. By provision of the vertical slots $e$ in the base plate 9, the latter may be vertically adjusted to compensate for an abnormal elevation or depression of the post A, due to frost or other cause, and also compensate for the sagging of the gate on its hinges if this occurs.

It is claimed for this improved gate latch that all parts of it may be cast from metal into shape, and a strong, reliable, shapely, and perfectly operating latch is afforded at low cost.

Having thus described my invention, I claim as new and desire to secure by Letters Patent:

1. A gate latch, embodying a bracket plate having a track bar along its lower edge, two similar latch dogs each having a longitudinal vertical slot therein, said dogs at their outer ends being pivoted upon the bracket plate above the track bar, a tripping bar having two depending lugs pivoted in the slots, and a latching arm adapted to ride on the track bar and fall into locked engagement with the inner ends of the latch bars.

2. A gate latch, embodying a bracket plate securable on a latching post, a track bar formed on the lower edge of the bracket plate and having oppositely sloped faces on the upper side, two similar latch dogs each having a vertical longitudinal slot therein, said dogs having the outer ends thereof pivoted upon the bracket plate, and their inner ends convexed, said ends being spaced apart, a tripping bar having two depending lugs thereon, each having a transverse diagonal slot therein, each lug being pivoted through a respective slot within a corresponding slot in one of the latch dogs, a base plate securable upon an end bar of a gate, and an arm extended laterally from said base plate, the arm having concave sides that mate with the convex ends of the latch dogs.

In testimony whereof I have signed my name to this specification in the presence of two subscribing witnesses.

THOMAS ROSCOE VARNELL.

Witnesses:
EUNICE SUTTLE,
P. H. GRAHAM.